Aug. 10, 1943.   E. J. WOOD   2,326,716
DUAL FLOW PIPE FITTING
Filed Sept. 19, 1941

Inventor
Edwin J. Wood

J. S. Murray
Attorney

Patented Aug. 10, 1943

2,326,716

UNITED STATES PATENT OFFICE 2,326,716

DUAL FLOW PIPE FITTING

Edwin J. Wood, Detroit, Mich.

Application September 19, 1941, Serial No. 411,458

2 Claims. (Cl. 138—38)

This invention relates to pipe fittings and particularly fittings affording a dual fluid flow.

In a hot water or like system of heating, there may be economically employed a dual flow type of diametrically partitioned pipe, delivering hot fluid to the radiators at one side of its partition and accommodating a cooled return flow at the opposite side of such partition. It is desirable in using horizontal lengths of such pipe to flow the hot and cooled fluids respectively above and below the partition, since the hot fluid connection of a radiator is commonly above the cooled fluid connection. Also location of the hotter fluid above the other minimizes heat loss by transmission through the partition. When a section of the described pipe is extended upwardly and connected at its ends through partitioned elbows to horizontal sections of the pipe, one of such elbows may tend to reverse the required relation of the hot and cooled fluids in the corresponding horizontal pipe section.

An object of the invention is to provide a dual flow pipe coupling for connecting horizontally partitioned sections of pipe and placing the upper passage of each section in communication with the lower passage of the other section, so as to restore a proper relation of the passages, if such relation has become reversed in a certain pipe section or fitting.

Another object is to provide a dual flow elbow designed to avoid reversal of the proper relation of the fluid passages in connecting upright and horizontal sections of dual flow pipe.

These and various other objects are attained by the construction hereinafter described and illustrated in the accompanying drawing.

Figure 1:
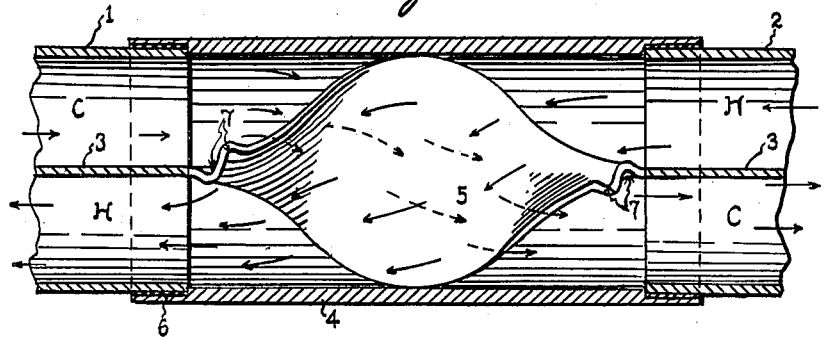
Fig. 1 is an axial vertical sectional view of one type of dual flow coupling suited to the desired purpose.
Figure 2:
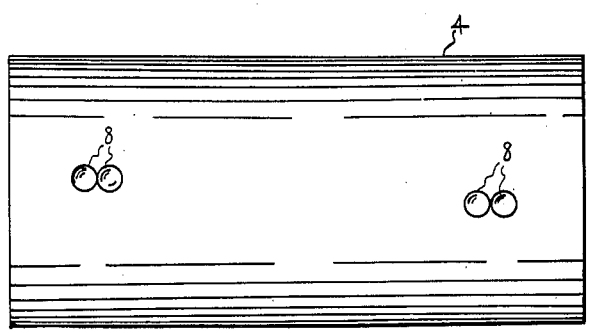
Fig. 2 is a side view of said coupling.

Describing said views now in greater detail, the reference characters 1 and 2 designate respectively two aligned pipes similarly provided with horizontal partitions 3, forming passages in each pipe designated H and C, for the flow of hot and cooled water or some other fluid. Said pipes are inserted in the ends of a coupling comprising a short length of pipe 4 and an inserted partition 5 abutting the partitions 3 and spirally twisted through a curvature of substantially one hundred and eighty degrees. The effect of shaping the fitting partition as described is to reverse the relation of the passages H and C at opposite ends of the coupling. Thus when the hot fluid passage is improperly positioned beneath the cooled fluid passage, as in the pipe 1, the described coupling so connects to the pipe 2 as to assure a correct relation of the passages therein.

As is common, the pipes 1 and 2 are retained in the coupling by an interposed thin layer of solder 6. The partition 5 is retained in place by forming each of its end portions at each pipe-engaging margin thereof with a pair of slight reverse indentations 7 and by forming the pipe 4 with indentations 8 engaging in the indentations 7. Thus the partition 5 is restrained from shifting either longitudinally or rotatively in the pipe 4.

The described fitting contributes very materially to the practicality of a dual flow system of piping for heating purposes, assuring that a proper relation of the hot and cooled water passages in horizontal lengths of pipe may be maintained, or readily reestablished if disturbed in connecting such a length to a vertical section of the dual flow pipe.

What I claim is:

1. In a dual flow pipe, a partition inserted in said pipe in a substantially diametrical relation thereto, said partition being formed at opposite margins thereof with indentations projecting from opposite sides of the partition, and said pipe having indentations engaging in said indentations of the partition.

2. In a dual flow pipe, a partition inserted in said pipe in a substantially diametrical relation thereto, said partition being formed at each of its diametrically opposed margins with two reverse indentations and said pipe having indentations engaging in said indentations of the partition.

EDWIN J. WOOD.